(12) United States Patent
Bruno

(10) Patent No.: US 11,416,670 B2
(45) Date of Patent: Aug. 16, 2022

(54) METHOD OF GENERATING STYLIZED TEXT MESSAGES

(71) Applicant: Jocelyn Bruno, Cibolo, TX (US)

(72) Inventor: Jocelyn Bruno, Cibolo, TX (US)

(*) Notice: Subject to any disclaimer, the term of this patent is extended or adjusted under 35 U.S.C. 154(b) by 0 days.

(21) Appl. No.: 16/806,290

(22) Filed: Mar. 2, 2020

(65) Prior Publication Data

US 2021/0271801 A1 Sep. 2, 2021

(51) Int. Cl.
*G06F 40/109* (2020.01)
*H04M 7/00* (2006.01)
*G06F 3/0482* (2013.01)
*H04L 51/046* (2022.01)
*H04L 51/066* (2022.01)

(52) U.S. Cl.
CPC .......... *G06F 40/109* (2020.01); *G06F 3/0482* (2013.01); *H04L 51/046* (2013.01); *H04L 51/066* (2013.01); *H04M 7/0048* (2013.01)

(58) Field of Classification Search
CPC .............. G06F 40/109; H04M 7/0048; H04M 1/72436; H04L 51/58
See application file for complete search history.

(56) References Cited

U.S. PATENT DOCUMENTS

| | | | |
|---|---|---|---|
| 8,116,791 B2 | 2/2012 | Agiv | |
| 8,311,527 B2 | 11/2012 | Jeung et al. | |
| 2004/0044966 A1* | 3/2004 | Malone | G06F 40/166 715/255 |
| 2008/0280633 A1* | 11/2008 | Agiv | H04L 51/066 455/466 |
| 2009/0079750 A1* | 3/2009 | Waxman | G06Q 10/107 345/581 |
| 2009/0275351 A1* | 11/2009 | Jeung | H04L 51/58 455/466 |
| 2012/0231774 A1* | 9/2012 | Blades | H04L 51/10 455/414.4 |
| 2014/0051402 A1* | 2/2014 | Qureshi | H04L 51/52 455/413 |
| 2014/0052801 A1 | 2/2014 | Zuo et al. | |
| 2015/0332482 A1* | 11/2015 | Sahibzada | G06F 40/109 345/589 |
| 2016/0004672 A1* | 1/2016 | Sakunkoo | H04L 51/08 715/269 |
| 2016/0035123 A1* | 2/2016 | Bonansea | H04W 4/14 345/473 |

(Continued)

*Primary Examiner* — Phong X Nguyen
(74) *Attorney, Agent, or Firm* — Volta Law Group

(57) ABSTRACT

The present invention relates to a text messaging application which allows for highly stylized and personalized messages to be sent between users of the application. When installed on a user device, the application becomes the default application for receiving text messages. Incoming text messages are processed by the text application, and text messages of a standard format are sent to a standard text messaging application, which is then initiated to display standardized text. When messages are received from a communications device having the inventive application installed, the stylized font and image data are displayed as intended on any phone having the inventive application installed using a GUI driven menu, the menu providing a text box within which the text message is displayed, as well as commands for manipulating fonts and other image data.

8 Claims, 3 Drawing Sheets

(56) References Cited

U.S. PATENT DOCUMENTS

| | | | |
|---|---|---|---|
| 2016/0103608 A1* | 4/2016 | Nukala | H04L 51/10 |
| | | | 345/419 |
| 2017/0161234 A1* | 6/2017 | Mickley | H04W 4/14 |
| 2018/0295072 A1* | 10/2018 | Yim | G06T 11/60 |
| 2020/0089738 A1* | 3/2020 | Mickley | G06F 40/109 |
| 2021/0096729 A1* | 4/2021 | Dalonzo | G06F 3/04842 |

* cited by examiner

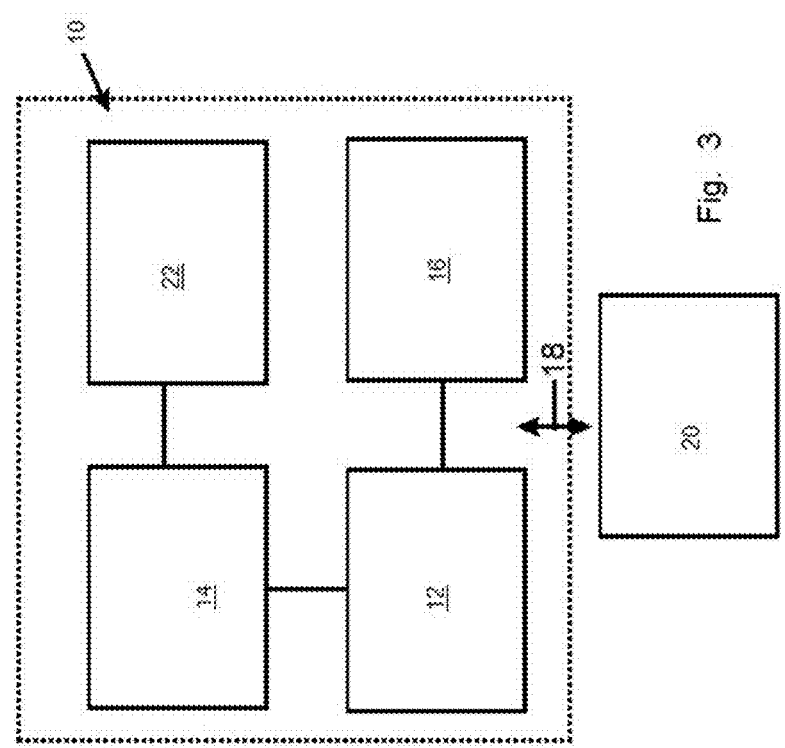

METHOD OF GENERATING STYLIZED TEXT MESSAGES

1. FIELD OF THE INVENTION

The present invention relates generally to text (SMS), broadcast, social, and other related communication messaging platform services. More particularly, the invention relates to a method of generating and sending stylized text messages between users of mobile communications devices.

BACKGROUND OF THE INVENTION

Messaging, in particular text messaging between various types of microprocessor based communications devices, has evolved over the years. With the advent of the so called "smartphones" with their large and easily accessible displays, text messaging has nearly surpassed voice conversation in certain age demographics. Mobile telephonic devices typically come with native text messaging applications, usually SMS formatted, pre-installed. These applications will typically process an incoming text message, which processing may include receiving and decoding protocols related to various text formatting commands, as well as data related to images, photos, or other attachments. Text and other related data transmitted between users of smartphones having e.g., different operating systems (Android, Iphone), is transmitted using standard formats such as SMS so that phones can send and receive text messages having, e.g, stylized fonts etc. Using standard transmission protocols however limits the extent to which text and image data can be manipulated to allow a user to send a "personalized" text message.

The present invention relates to a text messaging application which allows for highly stylized and personalized messages to be sent between users of the application. When installed on a user device, the application becomes the default application for receiving text messages. Incoming text messages are processed by the text application, and text messages of a standard format are sent to a standard text messaging application, which is then initiated to display standardized text. When messages are received from a communications device having the inventive application installed, the stylized font and image data are displayed as intended using a GUI driven menu, the menu providing a text box within which the text message is displayed, as well as commands for manipulating fonts and other image data.

SUMMARY OF THE INVENTION

It is a major object of the invention to provide an improved text messaging application.

It is another object of the invention to provide an improved text messaging application which allows the generation of stylized fonts not available with standard text messaging applications.

It is another object of the invention to provide an improved text messaging application which allows for the exchange of highly stylized text data between users of the application.

It is another object of the invention to provide an improved text messaging application which presents a GUI driven interface based on familiar word processing software interfaces.

BRIEF DESCRIPTION OF THE DRAWINGS

FIG. 3 shows a block diagram of a typical communication device using the application of the invention.

DETAILED DESCRIPTION

Figure 1:
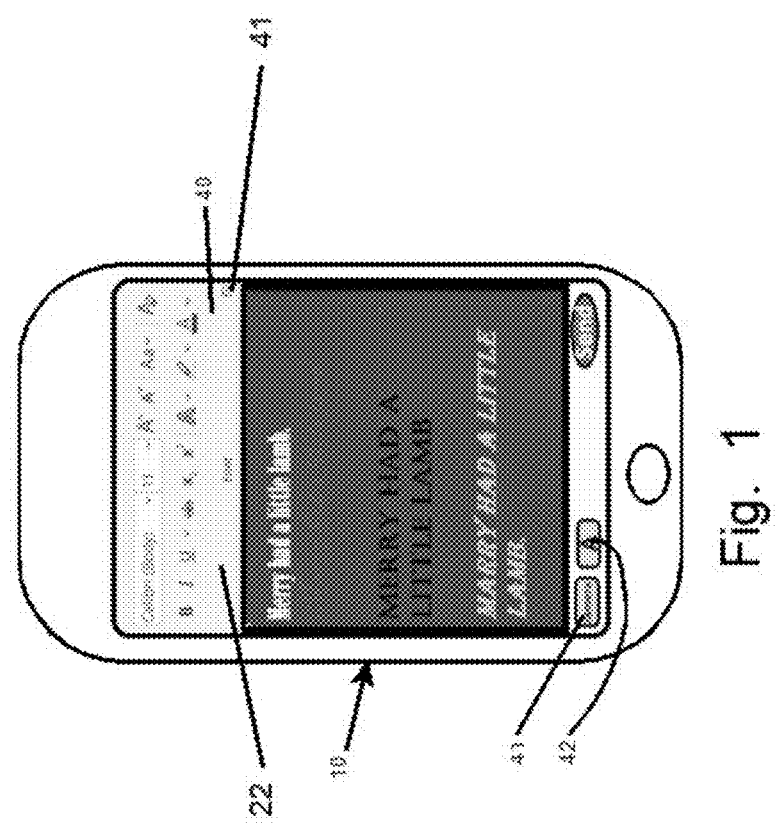
FIG. 1 shows a representation of a screen display of a device using the inventive system.

Referring now to FIGS. 1 and 3 a typical communication device 10 and associated display, according to the invention, are shown. The device 10 can be any device capable of sending and receiving text messages such as a smart phone or a tablet. The device 10 includes a processor 12 connected to a memory 14 that stores an operating program to control the functions of the device. The memory 14 also stores first and second texting applications, each with a set of instructions that, when executed by the processor 12, generates text messages and receives text messages. The first texting application is a standard SMS texting application which commonly comes pre-loaded on a typical smart phone. The second texting application is the application of the invention and the software for the second texting application resides solely in the memory of the device 10. The processor 12 is connected to an input/output port 16 for communication via a wireless network 18 with other communication devices 20 by which the text messages are exchanged.

The processor 12 is also connected with a display 22 for generating a visual representation of the text messages being generated, sent and received. The device operating program generates a visual representation of a keyboard on the display 22. The keyboard is an arrangement of touch sensitive keys on the screen of the display 22 by which a user can input a text message and control functions of the device 10. Also stored in the memory 14 is the font application (App) according to the invention. When the App is being executed by the processor 12, a custom keyboard is generated on the display 22 for creating text messages. The App may include a plurality of sets of fanciful fonts and colorful backgrounds, as can be seen in FIG. 3.

The basic operation of the system is as follows. The user operates the device 10 to cause the processor 12 to open the texting application loaded from the memory 14. The user then operates the device 10 to cause the processor 12 to open the font application (App) loaded from the memory 14. Then, the user can select one of the fanciful font sets available from the App using a menu generated by the App on the display 22.

Figure 2:
FIG. 2 shows a representation of several screen displays illustrating the font, background, and image generating aspects of the application.

The App automatically replaces the standard SMS interface as described above with a custom interface as seen in FIG. 2. The custom interface 40 allows for customized or stylized fonts but presents the options in a format familiar to the user. Specifically, the font menu of a well known word processing application such as Word or Wordperfect is presented to the user. It should be noted here that other well known word processor font menus are known and may be used for the purposes of the invention, the idea being to use an interface familiar to the highest percentage of the populations. Thus, there is no learning curve for the user familiar with the word processor interface. The "style" of the interface 40, i.e., whether Word or other word processor, can be selected by the user, which selection preferably occurs during the application download process. The interface 40 includes a camera icon or GUI which allows one to activate a camera associated with the device 10. When activated, the App allows for photos to be taken by the camera application of the device and inserted into a text message. The "A" button or icon 42 allows for attachments to be included in the text. When activated, the A button allows the user to access any file on the device in the well known manner.

A key aspect of the invention is that the App resides only on the device 10, and not on the server. Thus, only users that have downloaded the App can exchange text with font and image processing generated in the inventive method. This functioning is accomplished by the App automatically attaching a header file that contains all parameters set by the user, such as font style, font size, font color, background color, etc. Accordingly, when a user not having the App receives a text from a user with the App, the header is not recognized and the text message is processed by the standard SMS text application residing on the (non participating receiving) user's device.

In operation, the user inputs the letters and punctuation marks to compose a text message. The text style, background, and other formatting is accomplished using the interface 40. The user can preview the text before sending, and the inventive app allows for applying changes to formatted text without having to reenter the text. That is, the font, style, etc., of some or all of the entire text message can be changed by simply selecting the text to be changed using the select text procedure (which is built in to most smartphones) and uses the interface 40 to select the new text style. It can be seen that the interface 40 includes an expand icon 41, which expands the text formatting capabilities in exactly the same manner as the word processing software (e.g., Word or Wordperfect) the App is emulating. Once the formatted text message is input and approved of by the user, the processor 12 executes the texting application and the App to create the text message incorporating the selected customized font. The message incorporating the font is displayed in a preview window on the display 22 of the user device 10 as seen in FIG. 1. The user can then operate the device 10 to send the text message to either participating (users with the App on their device) or non-participating users by pushing the send button 47.

The stylized fonts can have any form capable of being generated on the display 22. FIG. 3 illustrates a few stylized messages of the type that can be generated using the App. It can be seen that the messages include colorful backgrounds and fanciful fonts not available using typical SMS protocols.

It is to be understood that the present invention is not limited to the sole embodiment described above, but encompasses any and all embodiments within the scope of the following claims:

I claim:

1. A method for generating customized font and image sets in text messages, each set having a background color, font size, font color, and font style, created with a communication device, said communicating device having a first, standard texting application, the method comprising the steps of:
    operating the communication device to cause a processor in the communication device to open and execute a second, non-standard texting application stored in a memory, the second non-standard texting application providing a graphical user interface driven interface menu;
    operating the communication device to cause the processor to open and execute a font application stored in the memory associated with said second non-standard texting application, the second non-standard texting application comprising a header file that contains all parameters set by a user;
    operating the communication device to select one of a plurality of customized font sets available in the font application;
    composing a text message by inputting text characters using a keyboard displayed by the communication device in a display, the processor responding to the text characters by creating the text message incorporating the selected customized font set in accordance with the second, non-standard texting application and the font application; and
    displaying the text message incorporating the customized font set in the display.

2. The method of claim 1, wherein said interface menu is similar to a font menu from a word processor application.

3. The method of claim 2, wherein said word processor application is Microsoft Word.

4. The method of claim 2, wherein said word processor application is Corel Wordperfect.

5. The method of claim 1, wherein said second non-standard texting application resides only on the communication device.

6. The method of claim 5, wherein only users that have downloaded the second non-standard texting application can exchange text with the font and image processing set by the user.

7. The method of claim 6, wherein the parameters set by the user comprise a font style, a font size, a font color, and a background color.

8. The method of claim 7, wherein a non-participating receiving user not having the second non-standard texting application receives a text from the user with the second non-standard texting application as a standard text message.

* * * * *